No. 834,495. PATENTED OCT. 30, 1906.
J. P. SANDEFUR.
TRAP.
APPLICATION FILED JUNE 7, 1906.

2 SHEETS—SHEET 1.

Witnesses
C. R. Thomas
F. B. MacNab

Inventor
J. P. Sandefur
By Chandler & Chandler
Attorneys

No. 834,495. PATENTED OCT. 30, 1906.
J. P. SANDEFUR.
TRAP.
APPLICATION FILED JUNE 7, 1906.

2 SHEETS—SHEET 2.

Witnesses
C. R. Thomas
F. B. MacNab

Inventor
J. P. Sandefur.
By Chandler & Chandler
Attorneys

UNITED STATES PATENT OFFICE.

JAMES P. SANDEFUR, OF STAMFORD, TEXAS.

TRAP.

No. 834,495.
Specification of Letters Patent.
Patented Oct. 30, 1906.

Application filed June 7, 1906. Serial No. 320,658.

*To all whom it may concern:*

Be it known that I, JAMES P. SANDEFUR, a citizen of the United States, residing at Stamford, in the county of Jones, State of Texas, have invented certain new and useful Improvements in Traps; and I do hereby declare the following to be a full, clear, and exact description of the invention, such as will enable others skilled in the art to which it appertains to make and use the same.

This invention has relation to animal-traps; and it has for its object the provision of improvements that will render the trap simple in construction, easy and safe of manipulation in setting and handling the same, and make its operation certain.

The invention comprises two spiked bars, one of which is spring-actuated when the bait is disturbed and the trap is sprung, so as to catch the animal between the opposing spikes.

The invention will first be described in detail, in connection with the annexed drawings, forming a part of this specification and then be pointed out with distinctness and particularity in the subjoined claims.

Figure 1:
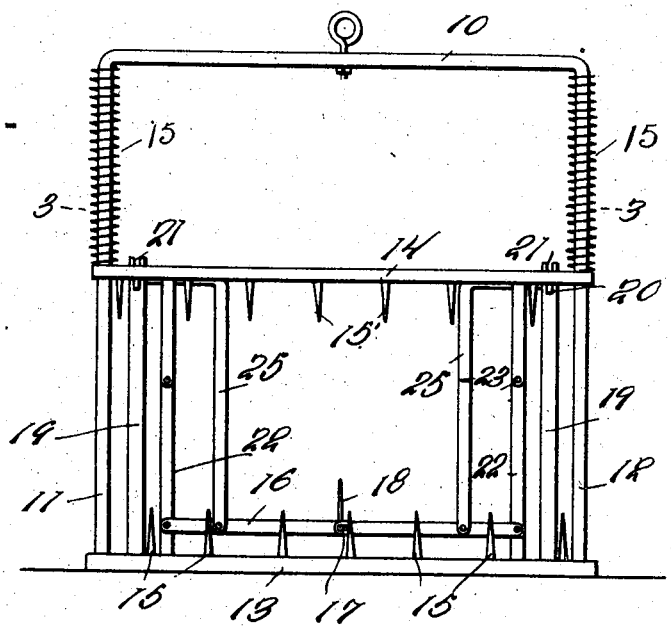
Figure 2:
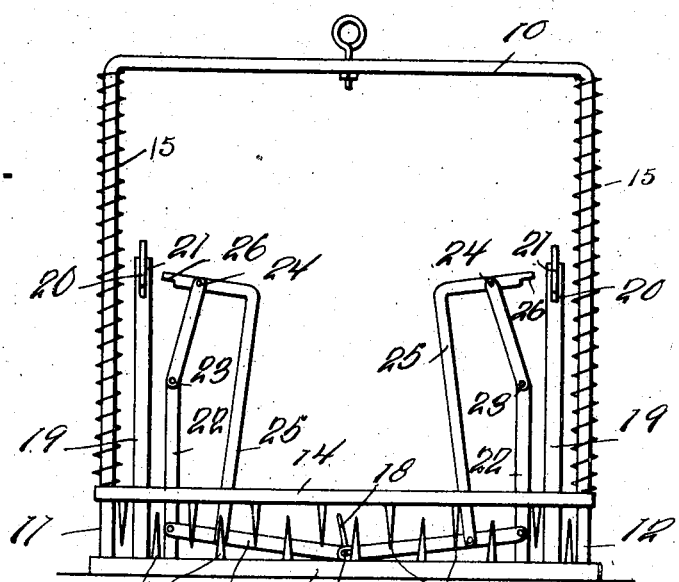
Figure 3:
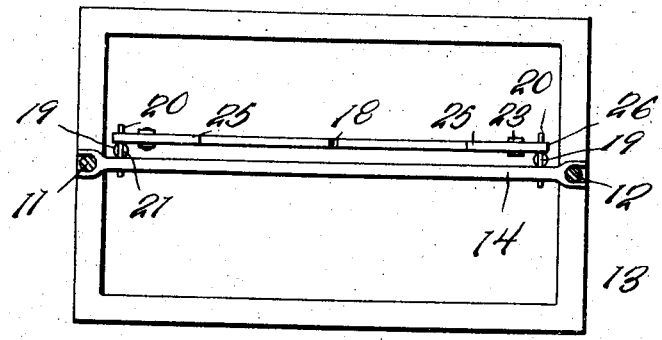
Figure 4:
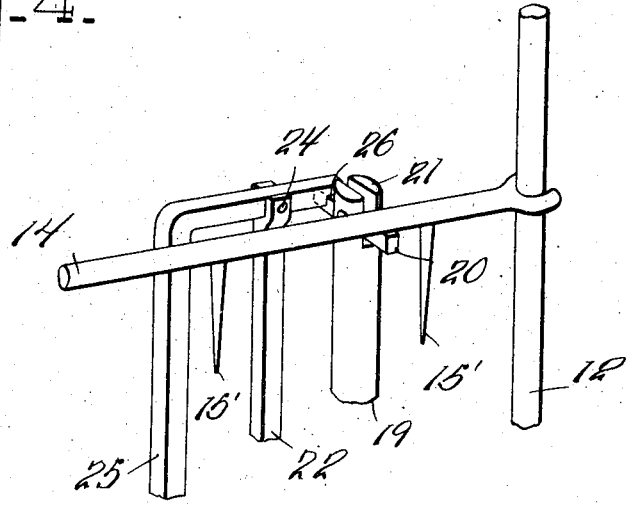

Of the said drawings, Figure 1 is a side view of the trap in "set" position. Fig. 2 is a like view of the invention, showing the trap as "sprung." Fig. 3 is a horizontal section on line 3 3 of Fig. 1. Fig. 4 is a detail perspective view of the latch and its supporting part.

Similar figures of reference designate similar parts or features, as the case may be, wherever they occur.

In the drawings, 10 designates the top bar, 11 and 12 the side bars, and 13 the bottom bar, of a rectangular frame forming the body portion of my improved trap.

14 is a bar adapted at its ends to engage the side bars and be guided by them as it slides up and down thereon. Helical springs 15 surround the upper portions of the side bars and bear on the cross-bar 14, their upper ends bearing against the upper bar 10. The cross-bar 14 is provided with sharpened spikes or pins 15', that project downward, and the lower bar 13 is similarly equipped, excepting that the spikes or pins 15 project upward.

Latch-standards 19 are carried by the outer ends of the bar 13 and are bifurcated at their upper ends, as shown at 21. Cross-pins 20 are pivoted in these bifurcations transversely of the cross-bar 14 for vertical movement and when in horizontal position are arranged to receive the cross-bar 14 thereupon and hold the latter against downward movement.

Uprights 22 are carried by the bar 13 inwardly of the standards 19 and have links pivoted to their upper ends, as shown at 23.

A bait-bar 16 includes two pivotally-connected sections, which are pivoted at their outer ends to the lower portions of the uprights 22 and are movable to lie in a common horizontal plane or with their inner ends depressed, and members 25 are pivoted at their lower ends adjacent to the outer ends of the bait-bar 16 and have their outer portions turned outwardly at right angles and pivoted to the upper ends of the links 23. It will thus be seen that when the pivoted portions of the bait-bar 16 are brought into alinement the upper portions of the members 25 will be moved outwardly, and the arrangement is such that their extremities are brought into position to engage over the pins 21 at one side of their pivot-points to hold the pins in position to receive the cross-bar 14 upon their opposite ends.

A bait-receiving finger 18 is carried by the bait-bar, as shown, and it will be understood that when the bar 14 is in raised position the springs 15 are held under tension to move the bar 14 downwardly when the latches are released.

When an animal attempts to take the bait from the bait-bar or materially disturbs the bait or presses on the bar, it will break the joint 17 therein and pull inward on the trip-standard, releasing their connection at their upper ends with the cross-pins 20. At the same instant the said cross-pins will let slip the ends of the spike-bar 14, and the springs 15 will "shoot" the same down, impaling the animal at the bait on the spikes or pins of the rods 13 and 14, all as will be clearly understood without further description.

The screw-eye or ring on the upper bar 10 may be used for securing the trap in place.

It is obvious that changes may be made in the form and arrangement of parts comprising the invention without departing from its general nature or spirit.

What is claimed as the invention is—

1. In a trap, the combination with uprights and a top bar, of a base-bar provided with upwardly-projecting spikes, a central vertically-movable spike-bar, springs on the uprights arranged to depress the central spike-bar, a hinged jointed bait-bar, and operative connections between the bait-bar and central spike-bar arranged to latch the latter in raised position when the joint of the bait-bar is straightened, and to release the spike-bar when the joint of the bait-bar is broken.

2. In a trap, the combination with uprights and a top bar, of a base-bar provided with upwardly-projecting spikes, a central spike-bar, springs on the uprights and arranged to depress the central spike-bar, a hinged jointed bait-bar, latch-standards, latch-pins pivoted in the standards for movement into and out of position to receive the central spike-bar thereupon and to hold the latter in raised position, uprights, links pivoted to the upper ends of the uprights, a hinged jointed bait-bar pivoted to the uprights, and angular members pivoted at their lower ends to the bait-bar and at their upper portions to the links, said members being arranged to lie in operative relation to the latch-pins, to hold the latter in operative position when the joint of the bait-bar is straightened, and to lie out of engagement with the latch-pins when the joint of the bait-bar is broken.

In testimony whereof I affix my signature in presence of two witnesses.

JAMES P. SANDEFUR.

Witnesses:
 D. W. ARNOLD,
 S. O. MARTIN.